US011183938B2

(12) United States Patent
Jiao et al.

(10) Patent No.: US 11,183,938 B2
(45) Date of Patent: Nov. 23, 2021

(54) HYBRID PV INVERTER WITH SCIB BATTERY INTEGRATION

(71) Applicant: Toshiba International Corporation, Houston, TX (US)

(72) Inventors: Da Jiao, Houston, TX (US); Yu Liu, Katy, TX (US); Mark Douglas Rayner, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 157 days.

(21) Appl. No.: 16/191,034

(22) Filed: Nov. 14, 2018

(65) Prior Publication Data

US 2020/0153351 A1     May 14, 2020

(51) Int. Cl.
*H02M 3/22*     (2006.01)
*H02M 3/335*     (2006.01)
*H02J 9/06*     (2006.01)
*H02J 3/38*     (2006.01)

(52) U.S. Cl.
CPC ......... *H02M 3/33584* (2013.01); *H02J 3/383* (2013.01); *H02J 9/06* (2013.01)

(58) Field of Classification Search
CPC ......... H02M 3/22; H02M 3/33584; H02J 9/06
USPC ........................................................ 307/64–66
See application file for complete search history.

(56) References Cited

U.S. PATENT DOCUMENTS

| 8,106,535 | B2* | 1/2012 | Nishimura | H02J 3/381 |
| | | | | 307/80 |
| 10,074,981 | B2* | 9/2018 | Faley | H02J 3/32 |
| 10,523,027 | B2* | 12/2019 | Sugeno | H02J 9/062 |
| 2011/0291479 | A1* | 12/2011 | Lee | H02J 3/381 |
| | | | | 307/43 |
| 2013/0264865 | A1* | 10/2013 | Sugeno | H02J 3/14 |
| | | | | 307/9.1 |
| 2014/0104890 | A1* | 4/2014 | Matsubara | H02M 3/3376 |
| | | | | 363/17 |
| 2015/0070024 | A1* | 3/2015 | Kim | H01M 10/48 |
| | | | | 324/430 |
| 2015/0295421 | A1* | 10/2015 | Blakemore | G06F 13/4077 |
| | | | | 320/129 |

(Continued)

*Primary Examiner* — Adi Amrany
(74) *Attorney, Agent, or Firm* — Baker Botts L.L.P.

(57) ABSTRACT

In accordance with presently disclosed embodiments, a hybrid power conversion system and method are provided. The hybrid power conversion system integrates multiple power sources. An isolated DC/DC converter manages power transfer between the power sources and the DC/DC converter and the power sources are connected such that a full power rating converter is not required. One of the power sources may comprise one or more battery strings, which may be selectively coupled to a DC/AC inverter. In one embodiment, the battery strings may be connected to a lead acid battery. Based on controller instructions, the isolated DC/DC converter replaces the power flow of the lead acid battery with the battery strings. In another embodiment, one or more battery strings may be selectively connected in series with a photovoltaic (PV) panel providing power to a load. When connected to the load, each of the battery strings may provide an incremental step up in power, boosting PV panel power. The number of battery strings that connect to the load at any given time may be based on the power provided by the PV panel and the power requirements of the load.

14 Claims, 10 Drawing Sheets

(56) References Cited

U.S. PATENT DOCUMENTS

| | | | |
|---|---|---|---|
| 2017/0085090 A1* | 3/2017 | Marzouk | H02M 3/33584 |
| 2017/0317501 A1* | 11/2017 | Moriyama | H02J 3/46 |
| 2017/0351561 A1* | 12/2017 | Yamazoe | G06F 11/0793 |
| 2018/0269685 A1* | 9/2018 | Sugeno | H02J 3/383 |
| 2018/0269782 A1* | 9/2018 | Mondal | H02J 7/0063 |
| 2018/0354371 A1* | 12/2018 | Malek | B60L 15/007 |
| 2019/0334349 A1* | 10/2019 | Liu | H02J 7/0018 |
| 2019/0372361 A1* | 12/2019 | Fishman | H02J 7/35 |

* cited by examiner

| PV VOLTAGE | NUMBER OF GROUPS CONNECTED | VOLTAGE OF CONNECTED GROUPS | DC BUS VOLTAGE OF THE DC-AC INVERTER |
|---|---|---|---|
| 780V~900V | 0 | 0V | 780V~900V |
| 690V~780V | 1 | 90V (90Vx1) | 780V~870V |
| 600V~690V | 2 | 180V (90Vx2) | 780V~870V |
| 510V~600V | 3 | 270V (90Vx3) | 780V~870V |
| 420V~510V | 4 | 360V (90Vx4) | 780V~870V |
FIG. 7
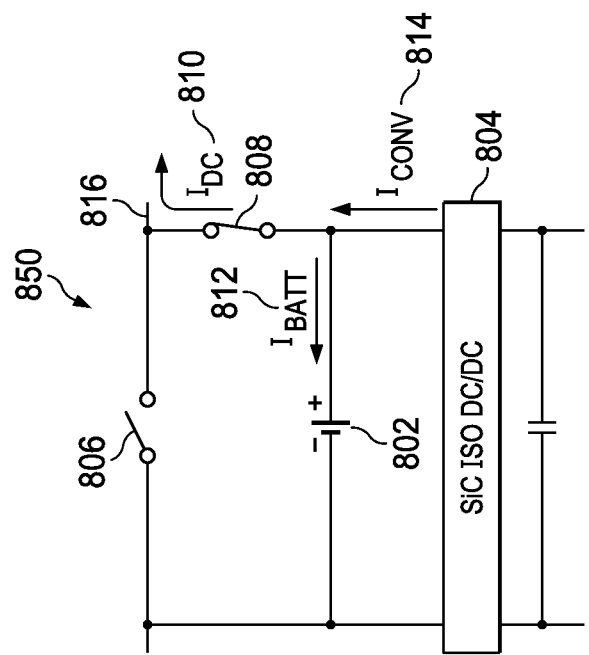
FIG. 8B
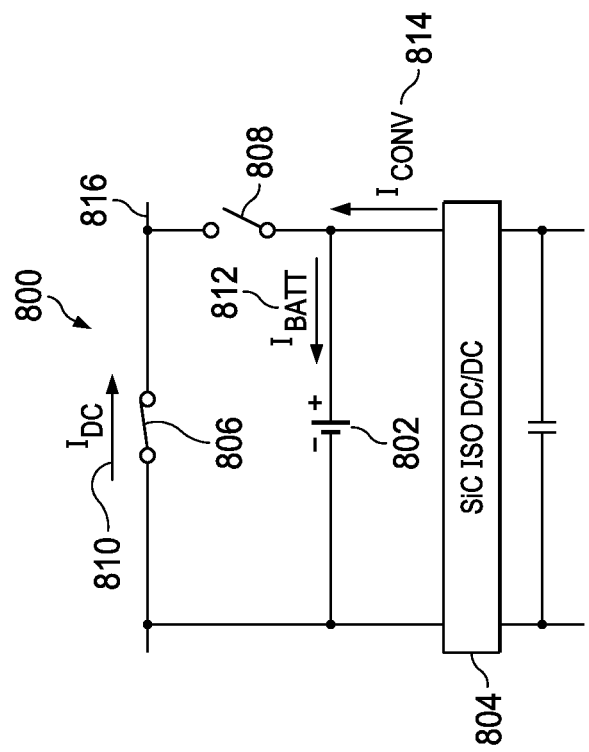
FIG. 8A

HYBRID PV INVERTER WITH SCIB BATTERY INTEGRATION

TECHNICAL FIELD

Embodiments of the present disclosure relate to power transfer between DC voltage sources, more particularly, to systems and methods for integrating different DC power supplies.

BACKGROUND

Power conversion is a common application in power electronics. Power converters use high-powered DC/DC converters to transfer power between two DC voltage sources. The power rating of DC/DC converters is typically measured as the total power transferred between the two DC voltages sources.

Batteries are a standard power source in power conversion systems. However, battery technologies continue to advance at a fast pace. Each generation provides increases to safety, longer life, and faster charging capabilities compared with previous generations. Consumers want to benefit from improvements in battery technology but would also like to continue to use the original power source to the end of its life. Consumers also want to avoid replacing entire systems each time improved batteries enter the market.

SUMMARY

In accordance with the above, presently disclosed embodiments are directed to combining power sources, more specifically, converting power between DC power supplies. In some embodiments, the power conversion system combines the fast charging/discharging capabilities and longer life of new battery technologies with legacy battery systems and power sources. Possible applications include, but are not limited to, photovoltaic inverters, battery chargers, uninterruptible power systems (UPS), and electric vehicles. Some embodiments describe integration of Toshiba's Super Charged Ion Battery (SCIB) with another DC power supply, such as lead-acid battery or a photovoltaic (PV) panel.

The presently disclosed embodiments are also directed to power conversion system that includes a modularized step up topology. In some embodiments, one or more of the batteries may be selectively and independently connected via a switch configuration in order to transfer boost voltage to a DC grid/load when a main power source cannot meet power demands. In some embodiments, the switch configuration permits battery charging by the main power supply and/or the grid/load regardless each battery's connectivity to the DC chain. In certain embodiments, the power conversion system topology may perform the same duty as conventional high-powered DC/DC converters using an isolated, low power DC/DC converter. In certain embodiments, the DC/DC converters may be bidirectional. In some embodiments, the DC/DC converters may maximize power transfer efficiency between power sources.

In some embodiments, the power conversion system may be a battery charger that includes includes a main cabinet housing a traditional UPS system and an add-on cabinet housing an add-on power module. The traditional UPS system may include a lead acid battery, DC/DC converter, and DC/AC inverter. The add-on power module may include one or more battery strings and a low-power isolated DC/DC converter. In certain embodiments, the isolated DC/DC converter controls power transfer of the battery string. Each battery string of add-on power module and the lead acid battery of UPS system may be connected in parallel. Additional add-on cabinets may be connected to the UPS system similarly. A system level controller may be connected to the lead acid battery of the UPS system and the isolated DC/DC converter of the add-on power module. The system level controller may be capable of sensing the demand on the lead acid battery in order to replace the lead acid battery power with power from the add-on power module.

In some embodiments, the power conversion system may be a hybrid photovoltaic (PV) inverter that includes one or more battery strings coupled to a PV inverter. The PV inverter comprises a PV panel and a DC/AC inverter. The PV inverter may be connected to an AC grid/load. In certain embodiments, each battery string may be selectively and independently coupled to the grid/load. Each battery string may also be selectively and independently coupled in series with the PV inverter. In certain embodiments, each battery string may be coupled to an isolated DC/DC converter. In some embodiments, the hybrid PV inverter may perform the following functions: (1) transfer DC PV power to the AC grid/load; (2) charge the battery strings from the PV panel; (3) discharge the battery strings, transferring the battery power to the AC grid/load along with the power supplied by the PV panel; (4) discharge the battery strings, transferring the DC battery power to the AC grid/load without additional power supply from the PV panel.

In certain embodiments, the power conversion system may possess a step up topology. Each battery string may be independently and selectively coupled to the grid/load via a switch configuration. In certain embodiments, each battery string may be selectively connected in series with the PV panel and the DC/AC inverter with a pair of switches. In this configuration each battery string may transfer power to the AC grid/load. In certain embodiments, each string may also be selectively bypassed with the switch configuration. In certain embodiments, the switch configuration of each battery string may independently connect the battery string to the grid/load, depending upon the power demand of the grid/load and the power supply of the PV panel. Each battery string that is connected to the circuit may provide an additional "step up" in power to the PV panel power supply to the DC load.

BRIEF DESCRIPTION OF THE DRAWINGS

For a more complete understanding of the present disclosure and its features and advantages, reference is made to the following description, taken in conjunction with the accompanying drawings, in which:

FIG. 7 is a table that illustrates system level controller management of the step up topology in accordance with an embodiment of the present disclosure;

FIG. 8a is a circuit diagram of an isolated DC/DC converter providing a charging current to a battery string that is not connected to the DC chain in accordance with an embodiment of the present disclosure;

FIG. 8b is a circuit diagram of an isolated DC/DC converter providing a charging current to a battery string that is connected to the DC chain in accordance with an embodiment of the present disclosure.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. Furthermore, in no way should the following examples be read to limit or define the scope of the disclosure.

The present disclosure relates to a hybrid power conversion system and method. The system and method may include power modules and a step up topology. Some embodiments may include a bidirectional isolated DC/DC converter, a lithium-ion (Li-ion) battery string, a battery management system (BMS), and a grid-tied DC/AC inverter. Certain embodiments may also include system level control and communication for operating the step up topology.

Some exemplary embodiments may integrate Toshiba's Super Charge Ion Battery (SCiB) lithium titanium battery with other forms of DC power supply, such as lead-acid battery systems. SCiB batteries are a type of Li-ion battery with a long life, fast charging capabilities, and large charging current. One of ordinary skill in the art can appreciate that a different type of battery with advanced properties may be integrated as well.

Figure 1:
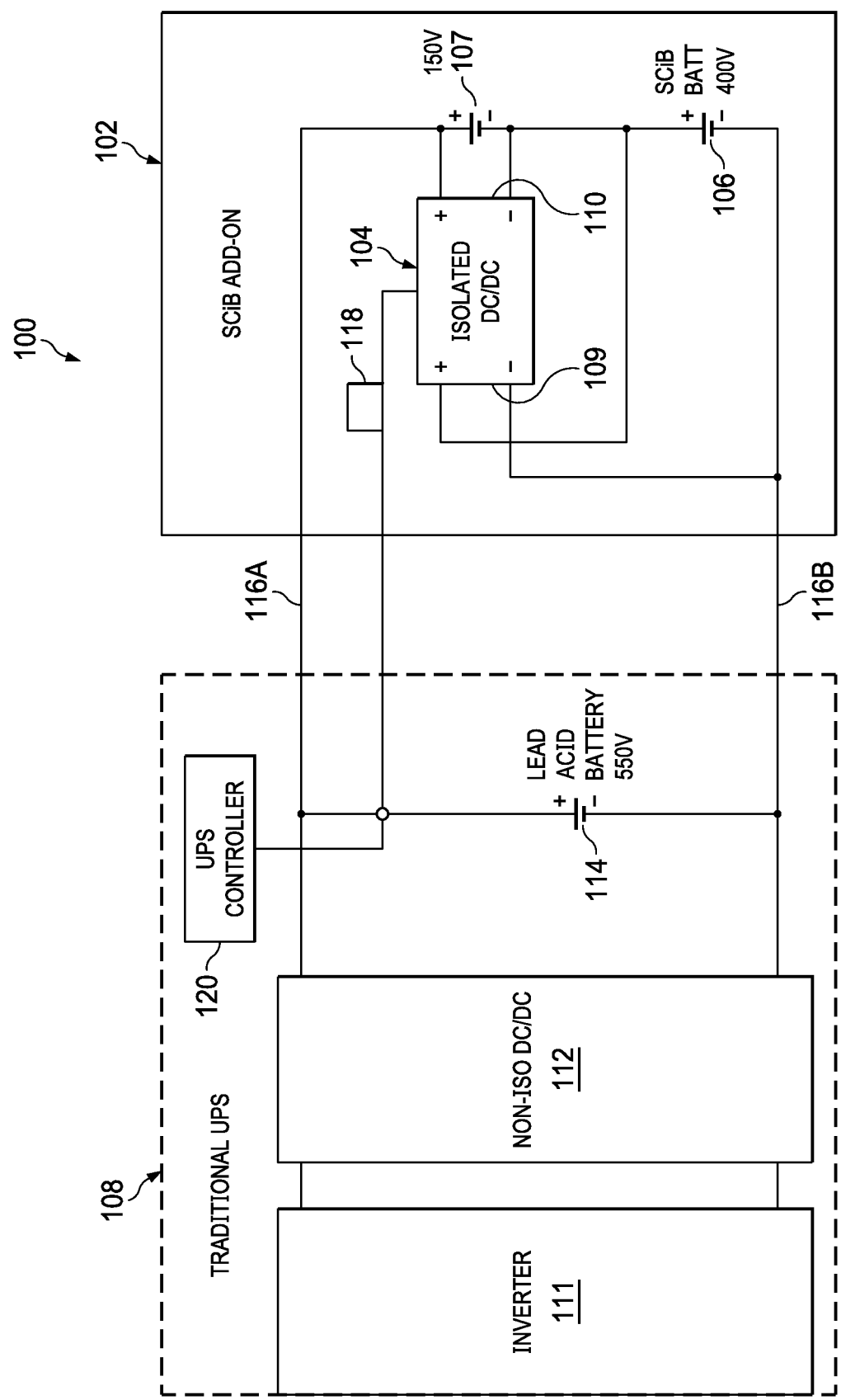
FIG. 1 illustrates a hybrid battery charger topology that includes an uninterrupted power supply (UPS) and an SCiB add-on power module, in accordance with an embodiment of the present disclosure.

Turning now to the drawings, FIG. 1 demonstrates integration of an SCiB add-on power module with a traditional uninterruptible power supply (UPS) system 100 in accordance with an embodiment of the present disclosure. In some embodiments, the system 100 may include an SCiB add-on power module 102 and a UPS 108, which is configured to supply power to a main power system. A person skilled in the ordinary art may appreciate that additional SCiB add-on power modules may be coupled to the UPS 108 and/or to an SCiB add-on power module 102.

In certain embodiments, the SCiB add-on power module 102 may house an isolated DC/DC converter 104, an SCiB battery string 106, and a low voltage DC source 107. The SCiB battery string 106 and the low voltage DC source 107 may be connected in series. The SCiB battery string 106 may be connected to a first port 109 of the isolated DC/DC converter 104 and the low voltage DC source 107 may be connected to a second port 110 of the isolated DC/DC converter. In some embodiments, the ports 109 and 110 of the isolated DC/DC converter 104 may be galvanically isolated.

In certain embodiments, the UPS 108 may house a DC/AC inverter 111, a non-isolated DC/DC converter 112, and a lead acid battery 114. In some embodiments, the UPS 108 may be electrically coupled to the SCiB add-on power module 102 via circuit connections 116A and 116B. In some embodiments, circuit connections 116A and 116B electrically couple the lead acid battery 114 of the UPS 108 to the SCiB add-on power module 102 via the low voltage DC source 107 in series with the SCiB battery string 106. The UPS 108 may be electrically coupled to the SCIB add-on power module 102 via the isolated DC/DC converter 104.

In certain embodiments, the isolated DC/DC converter 104 may manage power transfer of the SCiB battery string 106 to the UPS 108. In some embodiments, isolated DC/DC converter 104 possesses a low power rating. For example, the SCiB add-on power module may include a 30 kW isolated DC/DC converter 104 for a 100 kW UPS 108. In some embodiments, the isolated DC/DC converter 104 has a power rating less than the power rating of the SCiB add-on power module 102. In some embodiments, the power rating of the isolated DC/DC is determined by the voltage of the low voltage DC source 107. For example, the power rating may be further reduced by selecting a 107 with a lower DC voltage.

In some embodiments, the SCiB add-on power module 102 may be equipped with a system level controller 118 that manages power transfer between the SCiB add-on power module 102 and the UPS 108. In certain embodiments, the system level controller 118 may connect between the lead acid battery 114 of the UPS 108 and the isolated DC/DC converter 104 of the SCiB add-on power module 102. Based on this configuration, the system level controller 118 may control the power flow of the lead acid battery 114. The system level controller 118 may also control power flow of the SCiB battery string 106 via the isolated DC/DC converter 104.

Some embodiments illustrating system level controller 118 control of the power flow from the SCiB add-on power module 102 to the UPS 108 follow. In one embodiment, the system level controller 118 may measure the power demand on the lead acid battery 114. Based on this measurement, the system level controller 118 may tell the isolated DC/DC converter 104 to increase or decrease power flow from the SCiB battery string 106. The power supplied by the SCiB battery string 106 may supplement or displace the power supply of the lead acid battery 114.

In another embodiment, the SCiB battery string 106 provides power during short period energy demands, while the lead acid battery 114 provides power in the event the power delivery of the SCiB battery string 106 falls below a predetermined level. This configuration can reduce the frequency of use of the lead acid battery 114 and reduce the number of times it needs to be recharged, potentially increasing its useful life. The system level controller 118 may monitor the status of the lead acid battery 114 and the SCiB battery string 106 and adjust power flow from each via the isolated DC/DC converter 104.

In another embodiment, the system level controller 118 may be coupled to a UPS control module 120. The system level controller 118 may receive signals from the UPS control module 120 indicating that a main power system has failed. In this situation, the system level controller 118 may activate the SCiB add-on power module 102 such that power is provided from the SCiB battery string 106. The system level controller 118 may adjust the isolated DC/DC converter 104 to direct power from the SCiB add-on power module 102 until main power is restored. In situations where the SCiB add-on power module 102 has been depleted before main power is restored, the system level controller 118 may adjust the isolated DC/DC converter 104 to supply power from the lead acid battery 114.

Figure 2A:
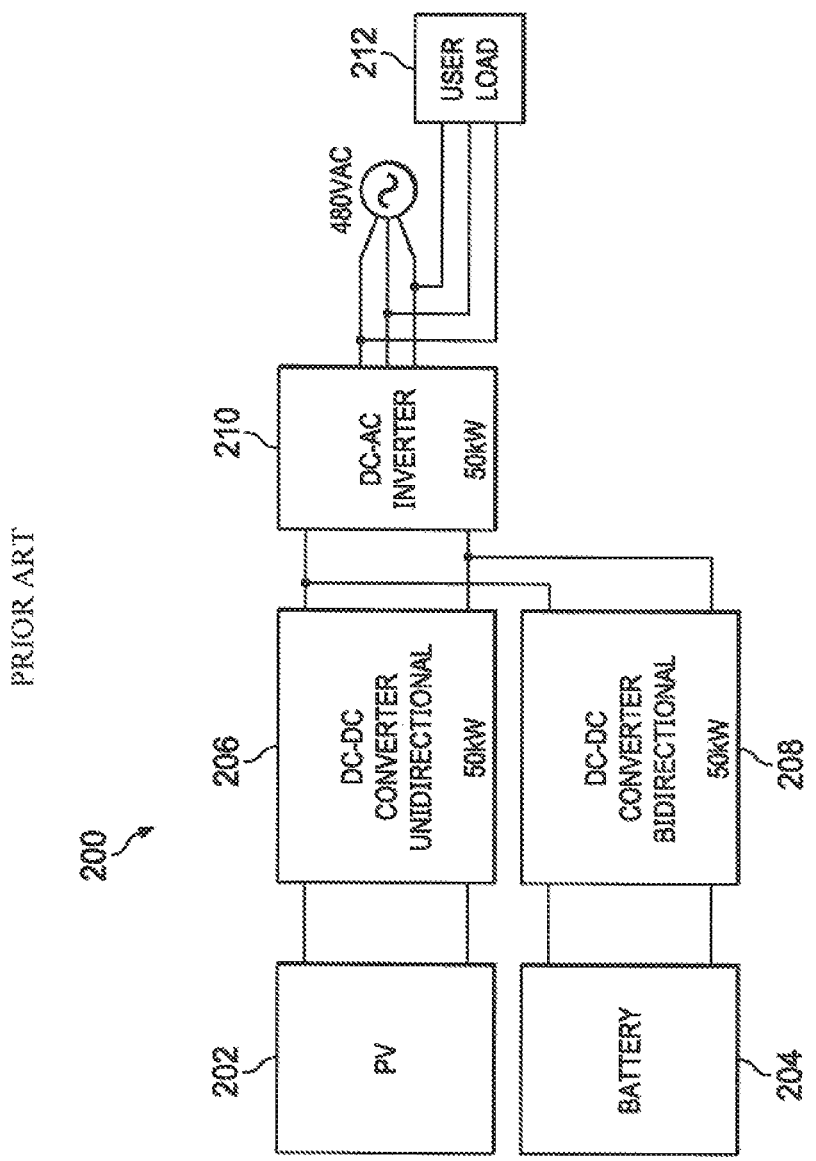
FIG. 2a illustrates a conventional hybrid PV inverter topology.

In reference to FIG. 2a, a traditional hybrid PV inverter system 200 is shown. The illustration includes PV strings 202 and battery strings 204. Each PV string 202 may have the following specifications: 50 kW, 480 VAC, 1000 VDC and each battery string 204 may be 12 kWh. A traditional system may also include a 50 kW unidirectional DC/DC converter 206 dedicated to manage the PV strings 202. It may also include an additional full-power rating 50 kW bidirectional isolated DC/DC converter 208 dedicated to manage the battery strings 204. As shown in FIG. 2a, the bidirectional isolated DC/DC converter 208 in a traditional system may manage all battery strings 204 as a unit.

A traditional system may also include a 50 kW DC/AC inverter 210 coupled to a grid/load 212. The DC/AC inverter 210 may manage power flow from the unidirectional DC/DC converter 206, the bidirectional isolated DC/DC converter 208, or a combination thereof. The battery strings 204 may be coupled to the grid/load 212 via the bidirectional isolated DC/DC converter 208 and the DC/AC inverter 210. The PV strings 202 may be coupled to the grid/load 212 via the unidirectional DC/DC converter 206 and the DC/AC inverter 210. The unidirectional DC/DC converter 206 may manage power flow of the PV strings 202 to the DC/AC inverter 210. The bidirectional isolated DC/DC converter 208 may manage power flow of the battery strings 204 to the DC/AC inverter 210.

Figure 2B:
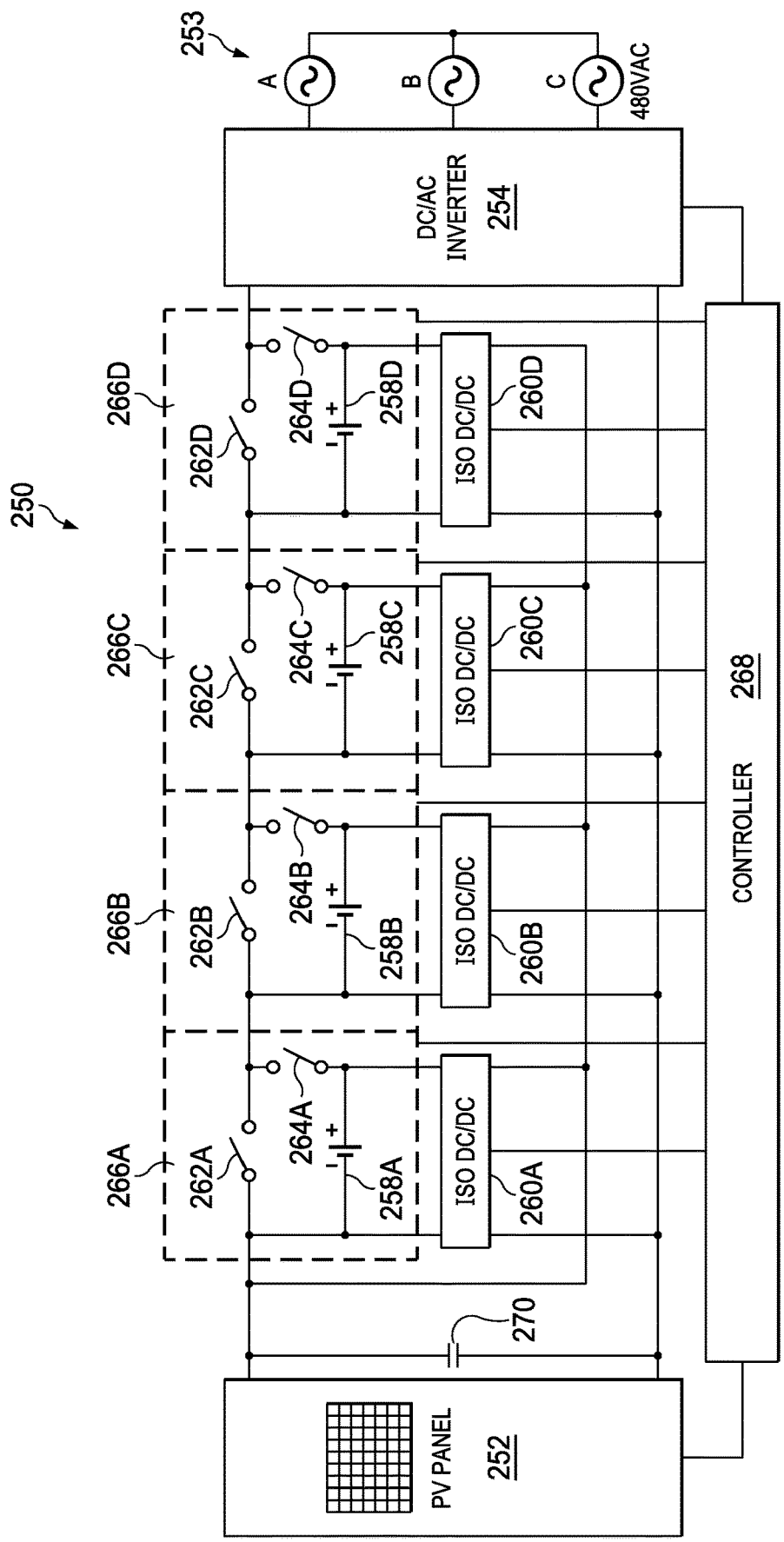
FIG. 2b illustrates a hybrid PV inverter topology in accordance with an embodiment of the present disclosure.

FIG. 2b illustrates an embodiment of the present disclosure of a hybrid PV inverter system 250. In certain embodiments, the hybrid PV inverter system 250 includes one or more PV panels 252. The PV panel 252 may provide AC power to an AC grid/load 253 via a 50 kW DC/AC inverter 254. In certain embodiments, the DC/AC inverter 254 may be bidirectional.

In some embodiments, the hybrid PV inverter system 250 may incorporate one or more power modules 266 (or 266A through 266D). Each power module may include a battery string 258 (or 258A through 258D, respectively) and a pair of switches 262 and 264 (or 262A through 262D, and 264A through 264D, respectively). Closing a bypass switch 262 and opening a boost switch 264 bypasses the associated battery string 258 and directly connects the PV panel 252 in series with the DC/AC inverter 254. Closing a boost switch 264 and opening a bypass switch 262 connects the associated battery string 258 in series with the PV panel 252 and the DC/AC inverter 254. Opening all of the bypass switches 262 and closing all of the boost switches 264 powers the DC/AC Inverter 254 entirely with the battery strings 258.

In certain embodiments, each power module may be coupled to an isolated DC/DC converter 260 (or 260A through 260D, respectively). The isolated DC/DC converters 260 may bidirectional. Each isolated DC/DC converter 260 may manage power flow of its respective battery string 258. In some embodiments, each isolated DC/DC converter 260 may manage charge/discharge of its associated battery string 258. In some embodiments, the isolated DC/DC converter of each power module has a power rating less than the power provided to the load.

In certain embodiments, the hybrid PV inverter system 250 may have a system level controller 268. The system level controller 268 may communicate with the PV panel 252, the DC/AC inverter 254, each, isolated DC/DC converter 260, and each power module 266. The system level controller 268 may independently manage each of the power modules 266 and each of the isolated DC/DC converters 260.

In some embodiments, the hybrid PV inverter system 250 may have the following efficiencies: (1) a greater than 98.5% PV panel 252 to grid/load 253 efficiency, (2) a greater than 97.5% PV panel 252 to battery string 258 efficiency, and (3) a greater than 97% battery string 258 to grid/load 253 efficiency.

In certain embodiments, each power module 266 of the hybrid PV inverter system 250 may have multiple operational modes. The operational mode may depend on the configuration of the switches 262 and 264. In certain embodiments, the mode may depend on the amount of power supplied by the PV panel 252. In some embodiments, the mode may depend on the power demand of the grid/load 253.

The following user cases will illustrate certain embodiments of these operational modes. For simplicity, the explanation for each user case will refer to power module 266A and isolated DC/DC converter 260A, but one of ordinary skill in the art can appreciate using the benefit of this disclosure that the other power modules 266B-D and their respective isolated DC/DC converters 260B-D may also perform the operational modes described below. One of ordinary skill in the art may appreciate that each power module 266 may operate in each mode independently of the others. In certain embodiments, the system level controller 268 independently controls the operational mode of each of the power module 266. One of ordinary skill in the art may also appreciate that one or more of the power modules 266 may operate in one mode while another one or more of the power modules 266 is operating in another. One of ordinary skill in the art may also appreciate that one or more of the power modules 266 may operate in the same mode as one or more of the other power modules 266.

User Case 1

In certain embodiments, a first mode may be implemented during the daytime when the PV panel 252 is receiving sufficient solar energy to power the grid/load 253. This mode may be implemented by closing bypass switch 262A and opening boost switch 264A. This configuration bypasses grid/load 253 from the battery string 258A but does not disconnect the battery string 258A from the PV panel 252 or the isolated DC/DC converter 260A. The PV panel 252 transfers DC power from the PV panel 252 to the AC grid/load 253 via the DC/AC inverter 254. In some embodiments, the PV panel 252 may also transfer PV energy to charge the battery string 258A via the isolated DC/DC converter 260A.

User Cases 2 & 3

In certain embodiments, user Cases 2 and 3 share similar configurations. Both user cases may be implemented during the daytime when the PV panel 252 does not meet the power requirements of the DC/AC inverter 254. In certain embodiments of both user cases, bypass switch 262A is open and boost switch 264A is closed, connecting the battery string 258A in series with the PV panel 252. In some embodiments of both user cases, power is supplied from both the PV panel 252 and the battery string 258A.

In some embodiments, the difference in the second and third user cases may be distinguished by the direction of battery string 258A power flow. The isolated DC/DC converter 260A may switch between user cases 2 and 3 by adjusting power flow direction either to or from the battery string 258A. In user case 2, the isolated DC/DC converter 260A directs power to the grid/load 253 by (a) transferring power from the PV panel 252 and (b) discharging the battery string 258A. In user case 3, the isolated DC/DC converter 260A (a) transfers power to the grid/load 253 directly and (b) charges the battery string 266A.

User Case 4

The fourth user case may be suitable for nighttime operation when the PV panel 252 is receiving insufficient solar energy to supply power or is disconnected from the hybrid PV inverter system 252. In certain embodiments of this user case, the battery string 266A and the grid 253 supply power. Similar to the second and third user case, bypass switch 262A is open and boost switch 264A is closed. In this configuration however, the battery string 266A discharges and transfers power to the AC grid/load 253. In some embodiments, the isolated DC/DC converter 260A may build voltage across a capacitor 270 with power supplied from the battery string 258A. In these embodiments, the capacitor 270 is connected in series with the DC/AC inverter 254 and provides power to the grid/load 253 in addition to the power supplied directly by the battery string 266A. To the extent additional battery power is required, battery strings 258B, 258C, and/or 258D may supply power to DC/AC inverter 254 via the opening and closing of the appropriate boost and bypass switches.

Figure 3A:
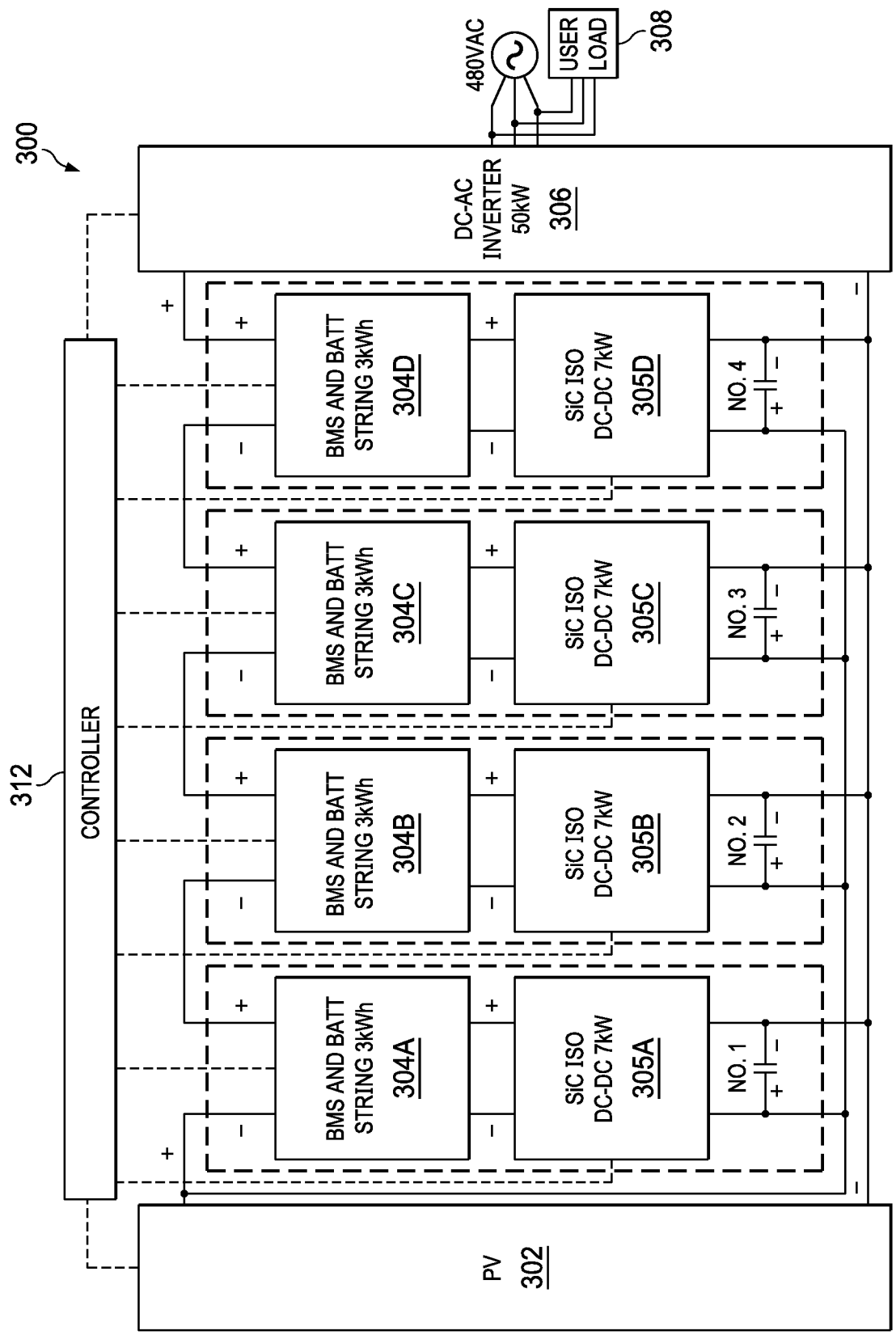
FIG. 3a illustrates a hybrid PV inverter topology that includes battery management systems (BMS) and silicon carbide (SiC) isolated DC/DC converters in accordance with an embodiment of the present disclosure.

FIG. 3a illustrates a hybrid PV inverter topology that includes battery management systems (BMS) in accordance with an embodiment of the present disclosure 300. The PV hybrid power conversion topology 300 includes a PV panel 302, a series of power modules 304, a series of silicon carbide (SiC) isolated DC/DC converters 305, and a DC/AC inverter 306. The DC/AC inverter 306 is electrically coupled to an AC grid/load 308. In some embodiments, the PV panel 302 and the power modules 304 are selectively connected to the AC grid/load 308 via a DC/AC inverter 306. In certain embodiments, the hybrid PV inverter topology 300 may include distributed management of the batteries. That is, each power module 304 may house a BMS and a battery string. In some embodiments, each power module 304 may be paired with an isolated DC/DC converter 305. The isolated DC/DC converters 305 are disposed between the power modules 304 and the PV panel 302 and may adjust power flow to/from these components accordingly.

In some embodiments, the system level controller 312 may independently communicate with and control the battery strings of the power modules 304 directly. In certain embodiments, the system level controller 312 may independently communicate with and control the battery strings of the power modules 304 via the BMS of the power modules 304. In certain embodiments, the system level controller 312 may independently communicate with and control the battery strings and the BMS of each power modules 304. In some embodiments, the system level controller 312 may communicate with the isolated DC/DC converters 305 and the DC/AC inverter 306. The system level controller 312 may receive data from each of these components as well as independently control the function of each. In some embodiments, the mode of communication between the system level system controller 312 and each of these components may be CAN bus based protocol and communication.

In an embodiment that includes a step up implementation, the system level controller 312 may independently control the connection of each power module 304 so that any combination of the power modules 304 bypass/connect to the circuit. Depending upon PV panel 302 power supply, the grid/load 308 may demand a DC boost from none, one, or some combination of two or more of battery blocks 304A-D.

An exemplary embodiment of the method for system level control of the power modules 304 may now be provided. In certain embodiments, the DC/AC inverter 306 requires a DC bus voltage of around 800 VDC in order to generate a 480 VAC power supply to the grid/load 308. If the PV panel 302 voltage supply is 800 VDC or more, the system level controller 312 may bypass all power modules 304, directly connecting the PV panel 302 to the DC/AC inverter 306.

When the system level controller 312 determines that the PV panel 302 voltage supply to the DC/AC inverter 306 is less than around 800 VDC, the system level controller 312 may connect one or more power modules 304 in series with the PV panel 302 to boost the PV voltage supply. The number of power modules 304 connected may be the number required to maintain the power supply to the grid/load 308 at around 800 VDC. In this illustrated embodiment, for example, each battery block 304A-D provides incremental 90V step ups in voltage.

Figure 3B:
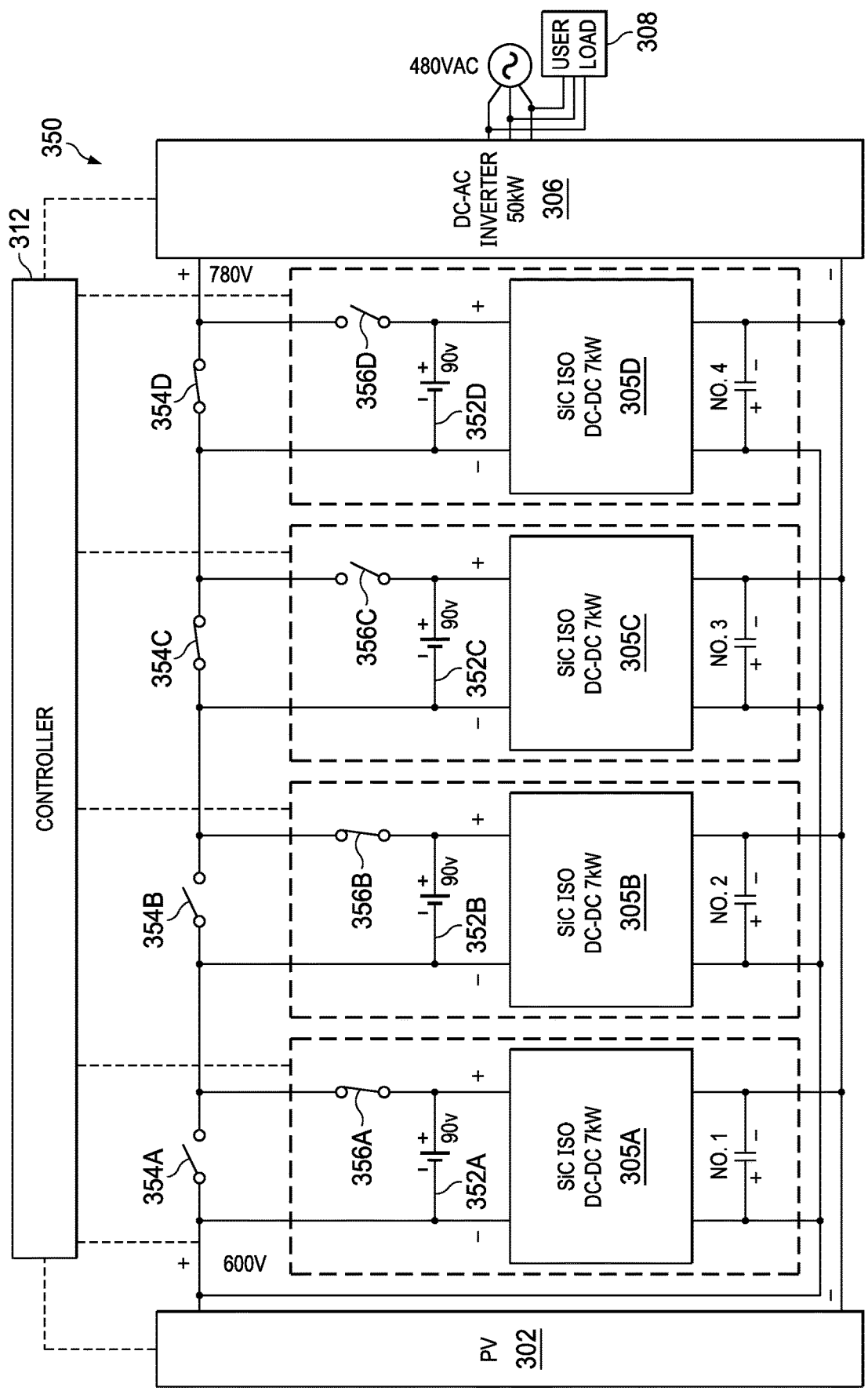
FIG. 3b illustrates a hybrid PV inverter topology that includes a step up configuration in accordance with an embodiment of the present disclosure.

FIG. 3b illustrates an embodiment of the step up strategy 350. This embodiment is similar to the illustrated embodiment of FIG. 3a, except in this embodiment replaces the power modules 304 of FIG. 3a with battery strings 352, bypass switches 354, and boost switches 356.

In some embodiments, the system level controller 312 may independently control opening and closing of the bypass switches 354 and boost switches 356. In the exemplary embodiment illustrated in FIG. 3b, the DC/AC inverter 306 requires a voltage supply between 700-800V and the system level controller 312 has determined that the PV panel 302 voltage supply is only 600V. To compensate for this deficiency, the system level controller 312 connects one or more of the battery strings 352 to boost the PV panel 302 voltage supply. In this particular embodiment, each battery string 352 has a nominal voltage of 90V, so, the system level controller 312 closes boost switches 356A and 356B and opens bypass switches 354A and 354B. As a consequence, battery strings 352A and 352B provide an overall additional 180V boost to the DC/AC inverter 306, providing a total of 780V to the DC/AC inverter 306. Also in this embodiment, the system level controller 312 keeps boost switches 356C and 356D open and bypass switches 354C and 354D closed. If the PV panel 302 voltage decreases, the system level controller 312 may additionally connect one or both battery strings 352C and 352D to bring the DC/AC inverter 306 voltage supply back above the 700V threshold. Although this embodiment connects battery strings 352A and 352B to the circuit, one of ordinary skill in the art can appreciate that the system level controller 312 may choose to connect or bypass any combination of the battery strings 352 to boost the PV panel 302 power supply.

In this exemplary embodiment, the isolated DC/DC converters 305 may control battery string 352 discharge. While battery strings 352A and 352B are discharging, isolated DC/DC converters 305A and 305B may manage the flow of charging current to the battery strings 352A and 352B. If isolated DC/DC converters 305A and 305B equate the charging current to each battery string 352A and 352B with their respective discharging currents, the battery strings 352A and 352B are neither charged nor discharged. In some embodiments, the system level controller 312 may monitor discharge of each battery string 352 and adjust to isolated DC/DC converter 305 current supply to each respective battery string 352.

In an embodiment similar to FIG. 3b, variable light conditions may cause the voltage of the PV panel 302 to change frequently. To maintain a stable power supply, one or more of the battery strings 352 may be automatically connected/disconnected based on the rise and fall of the PV panel 302 voltage supply. For example, battery string 352A may be connected to boost the PV panel 302 power supply during transient cloud coverage. Once the cloud passes and the PV panel voltage 302 rises accordingly, the battery string 352A may be automatically disconnected.

In another embodiment similar to FIG. 3b, the PV panel 302 may provide a weak power supply that requires one or more—but not all—of battery strings 352 to connect to the DC chain. In such a situation, the system level controller 312 may rotate engagement of the battery strings 352 with the DC chain. The system level controller 312 may rotate engagement to manage each battery strings' 352 voltage and/or temperature, for example. Additionally, the isolated DC/DC converters 305 may control discharge of each battery string 352 by adjusting isolated DC/DC converter 305 output, where the discharging current of the battery string 352 is equal to the DC bus current minus the isolated DC/DC converter 305 output current. In such an embodiment, the system level controller 312 may initially connect battery strings 352A and 352B, but as each battery string reaches a certain voltage or temperature, the system level controller 312 may independently replace the power supply from battery strings 352A and/or 352B with power supply from battery strings 352C and/or 352D.

Figure 4:
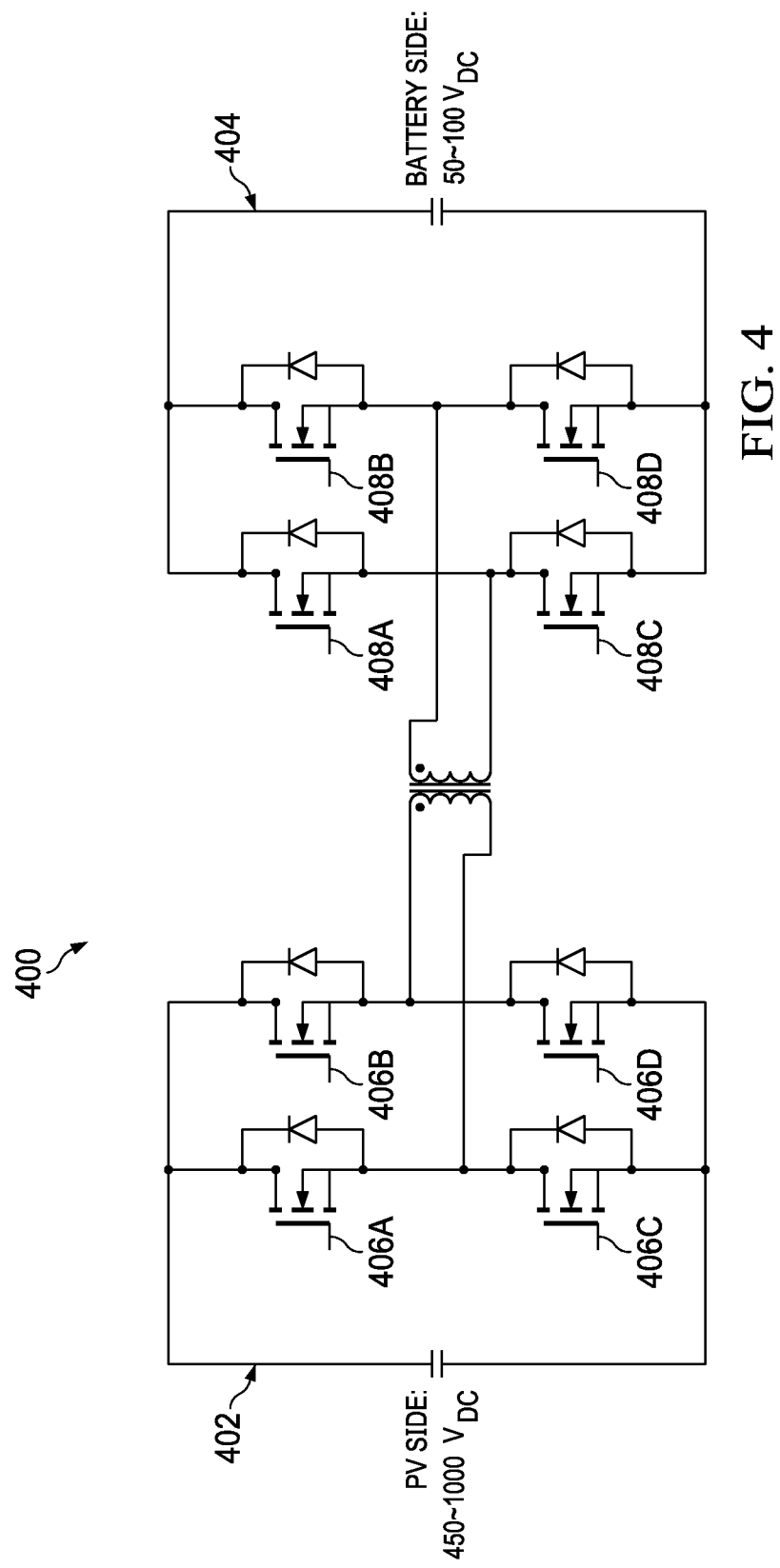
FIG. 4 illustrates a bidirectional isolated DC/DC converter topology in accordance with an embodiment of the present disclosure.

FIG. 4 illustrates an embodiment of isolated DC/DC converter topology 400. In certain embodiments, an isolated DC/DC converter with this topology may be 7 kW, isolated, bidirectional and/or any combination thereof. In certain embodiments, the isolated DC/DC converter with this topology may weigh less than 3 kg. In certain embodiments, the isolated DC/DC converter topology 400 may rely on soft switching (ZVS & ZCS).

In some embodiments, the isolated DC/DC converter topology may include a dual-active bridge topology. FIG. 4 illustrates a PV side H-bridge 402 and a Battery side H-bridge 404. In some embodiments, each H-bridge may be based on one or more silicon carbide (SiC) devices 406 & 408. In certain embodiments, the PV Side H-bridge 402 may use low-current 1200 SiC MOSFETs 406. In certain embodiments, the Battery Side H-bridge 404 may use high-current 600V or 1200V SiC MOSFETs 408. In some embodiments, the Battery Side H-bridge 404 might implement parallel low-current rating SiC MOSFETs (not shown). In some embodiments, the isolated DC/DC converter topology 400 may have a peak efficiency of 97.5% or more.

Figure 5:
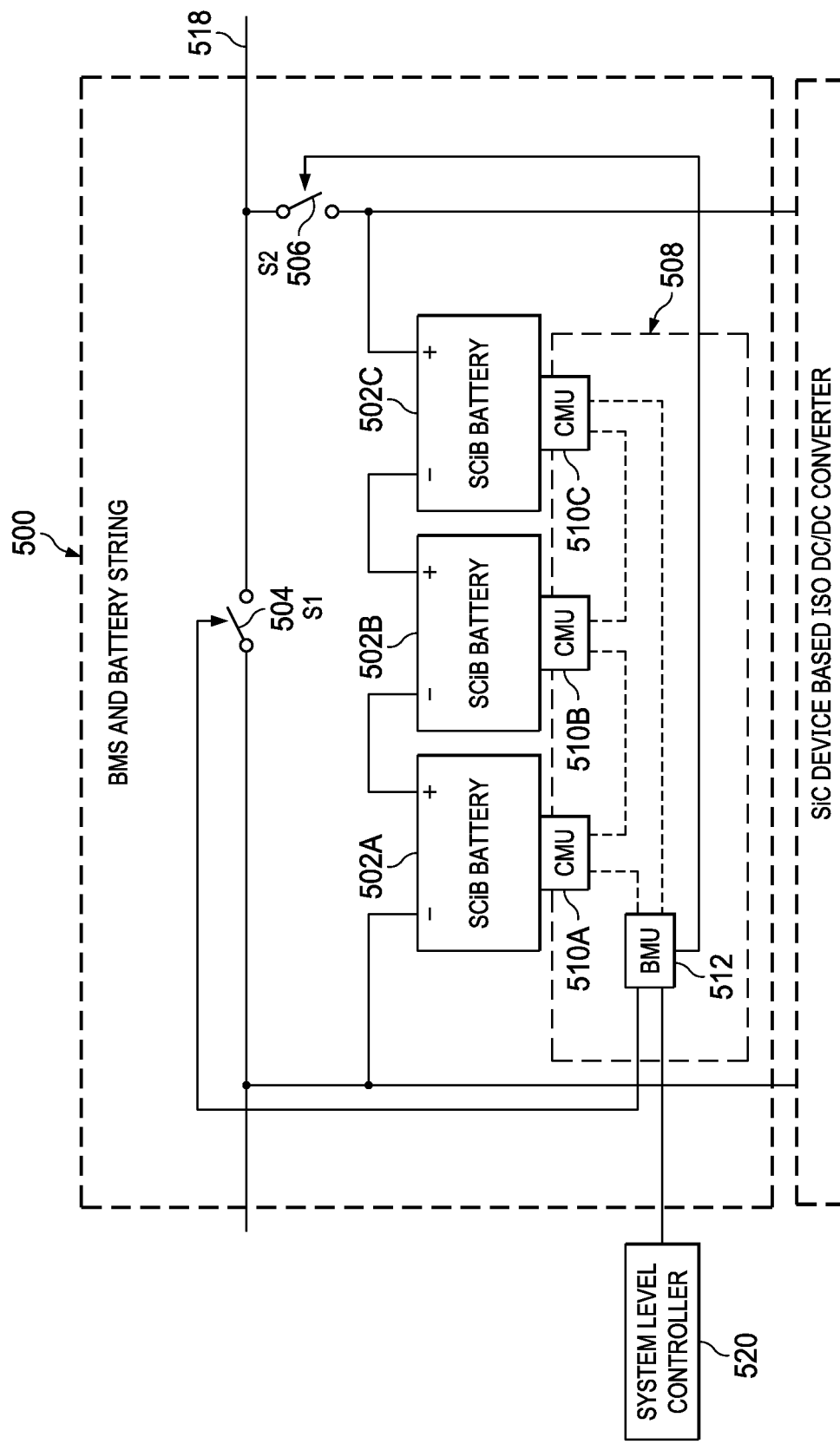
FIG. 5 illustrates a power module topology that includes a BMS and battery string in accordance with an embodiment of the present disclosure.

FIG. 5 illustrates an embodiment of a power module 500. Some embodiments may house a battery string 502, a bypass switch 504, and boost switch 506, and a battery management system BMS 508. The BMS 508 may include cell management units (CMU) 510, which may be paired to each battery string 502, and a battery management unit (BMU) 512. Each battery 502 of the battery string may be a Li-ion battery. In certain embodiments, each battery 502 of the battery string may be a Toshiba SCiB battery. In certain embodiments, the power module 500 may be coupled to an isolated DC/DC converter 516. In some embodiments, the power module 500 may be connected to a DC chain 518.

In some embodiments, the power module 500 may be connected to a DC chain 518 by the opening of bypass switch 504 and closing the boost switch 506. In some embodiments, each power module 500 may be bypassed by closing bypass switch 504 and opening boost switch 506.

In certain embodiments, the power module 500 may distribute management of the battery strings 502. Each CMU 510 may be connected to the BMU 512. In some embodiments, each CMU 510 may monitor the voltage, temperature, and/or other information about the battery string 502 to which it is paired. Each CMU 510 may then transmit collected data to the BMU 512. The BMU 512 may then process the CMU 510 data to manage the operation of each battery string 502 in order to prevent issues such as over charge, over discharge, temperature issues, and/or other issues. In certain embodiments, the BMU 512 may be connected to a system level controller 520. The BMU 512 may send data to the system level controller 520. In some embodiments, the BMU 512 may receive commands from the system level controller 520. For example, the system level controller 520 may direct the BMU 512 to open/close the switches 504 and 506.

Figure 6:
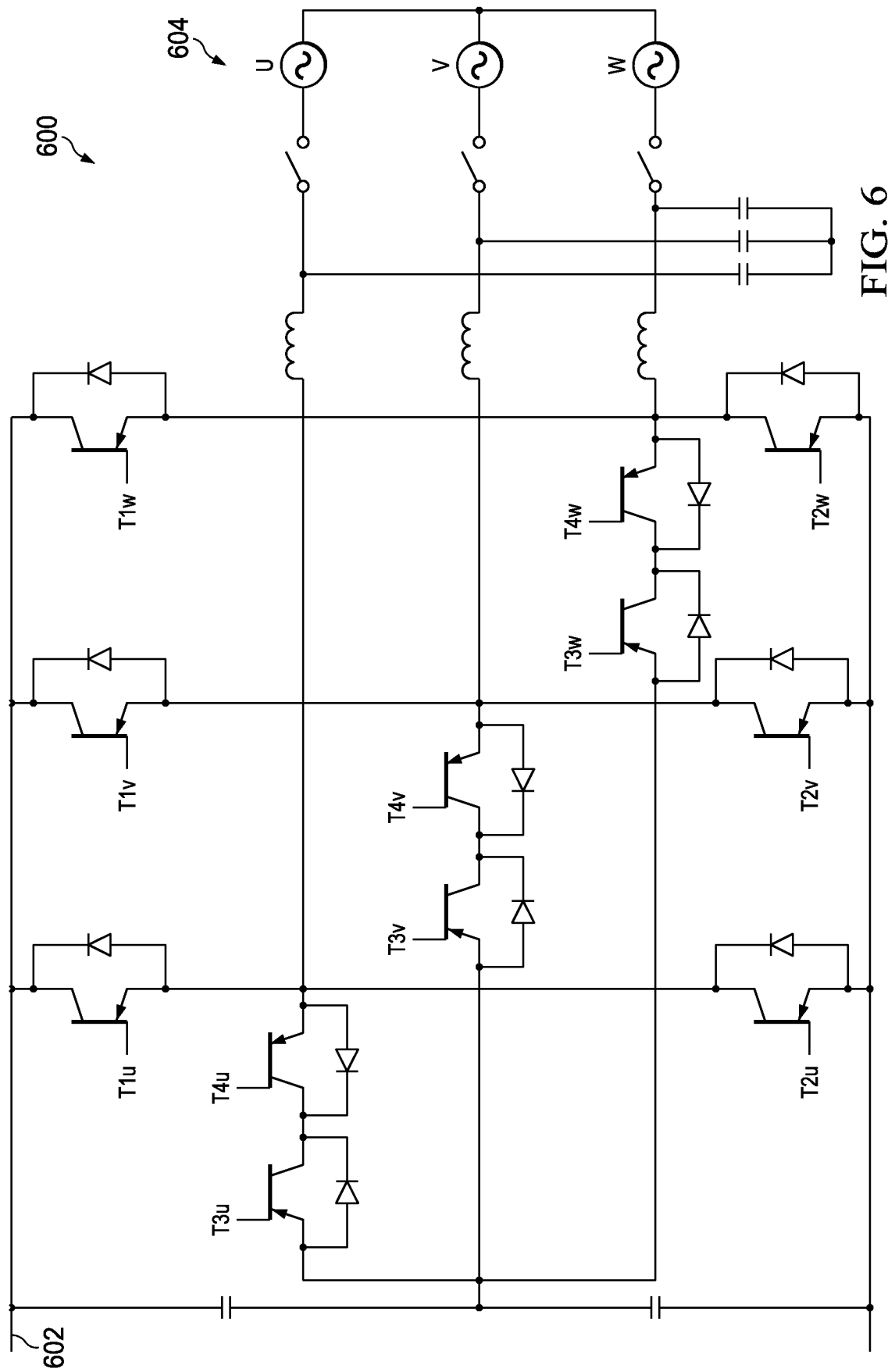
FIG. 6 illustrates a DC/AC inverter topology in accordance with an embodiment of the present disclosure.

FIG. 6 illustrates an embodiment of a grid-tied DC/AC inverter topology 600. In some embodiments, the DC/AC inverter topology 600 may have a T-type, 3-level topology. Further details on the DC/AC inverter topology 600 may be found in U.S. Pat. No. 9,871,436 (filed Nov. 15, 2016) and U.S. Pat. No. 9,979,319 (filed Nov. 22, 2016). In some embodiments, the DC/AC inverter with this topology 600 may be connected to a DC chain 602 that supplies an AC grid/load 604.

The table in FIG. 7 illustrates system level controller implementation of the step up strategy 700. The first column provides the voltage supply range from the PV panel. The second column provides the number of battery groups connected to the DC chain. The table provides for up to four battery groups, but one of ordinary skill can appreciate that additional battery groups could be added to the configuration. The third column provides the total incremental power supplied by each battery group when connected to the DC chain. The fourth column provides the total voltage (PV voltage and battery group voltage combined) supplied to the DC/AC inverter.

The number of battery groups connected to the DC chain depends on the voltage supply of the PV panel. For example, when the PV panel maintains a 780-900V supply (row 1, column 1), the system level controller bypasses all battery groups (row 1, column 2), resulting in a 0V step up from the battery groups (row 1, column 3). In this example, the 780-900V DC bus voltage (row 1, column 4) is wholly supplied by the PV panel.

As shown in the illustrated the table, when the PV panel voltage supply falls below 780V, battery groups are incrementally added to the DC chain to boost the power supplied by the PV panel to the DC/AC inverter. As shown in the second row of FIG. 7, the system level controller connects one battery string (column 2) to the DC chain in response to a PV panel voltage supply of 690-780 V (column 1). The resulting 90V from the battery string (column 3) steps up the DC bus voltage to the DC/AC inverter within the target 780-870V supply required by the DC/AC inverter (column 4).

As illustrated in row 3, when the PV panel voltage supply drops to 600-690V (column 1), the system level controller may connect two groups to the DC chain (column 2). Because the battery groups are connected in series, the addition of two battery groups steps up the voltage by 180V, maintaining the DC bus voltage around 780-870V (column 4). As illustrated in rows 4 and 5, the addition of more groups strings by the system level controller proceeds similarly to the addition of the first and second battery groups. When the PV panel voltage falls below the voltage requirement of the DC/AC inverter, the system level controller connects the appropriate number of battery strings to step up the voltage back to the target bus voltage range.

FIGS. 8a & 8b illustrate embodiments of battery string charging while connected 800 and disconnected 850, respectively. The embodiments in FIGS. 8a & 8b include different configurations of the same circuit elements. Each circuit includes a battery string 802, an isolated DC/DC converter 804, a bypass switch 806, and a boost switch 808. The circuit also includes three currents: a DC current 810, a battery charging current 812, and a converter current 814. The DC current 810 travels along a DC chain 816.

The embodiment in FIG. 8a illustrates battery string charging while disconnected from the main circuit 800. In this embodiment, the battery string 802 is bypassed by opening boost switch 808 and closing bypass switch 806. The DC current 810 supplied to the DC chain 816 may be supplied by a source other than the battery string 802, such as a PV panel. The isolated DC/DC converter 804 may charge the battery string 802 by directing the converter current 814 to the charging terminal of the battery string 802. In this illustrated embodiment, the converter current 814 and the battery charging current 812 are equal, because the open boost switch 802 directs all of the current supplied by the isolated DC/DC converter to the battery string 802.

The embodiment in FIG. 8b illustrates battery string charging while connected to the main circuit 850. Closing boost switch 808 connects the battery string 802 to the DC chain 816. In this embodiment, isolated DC/DC converter 804 supplies power to both the battery string 802 and the DC chain 816. That is, the converter current 814 supplied by the isolated DC/DC converter 804 splits to supply the battery charging current 812 and the DC current 810. In order to charge the battery string 802 and provide a large enough DC current 810, the isolated DC/DC converter 804 adjusts the converter current 814 to equal the sum of the battery charging current 812 and DC current 810.

Figure 9:
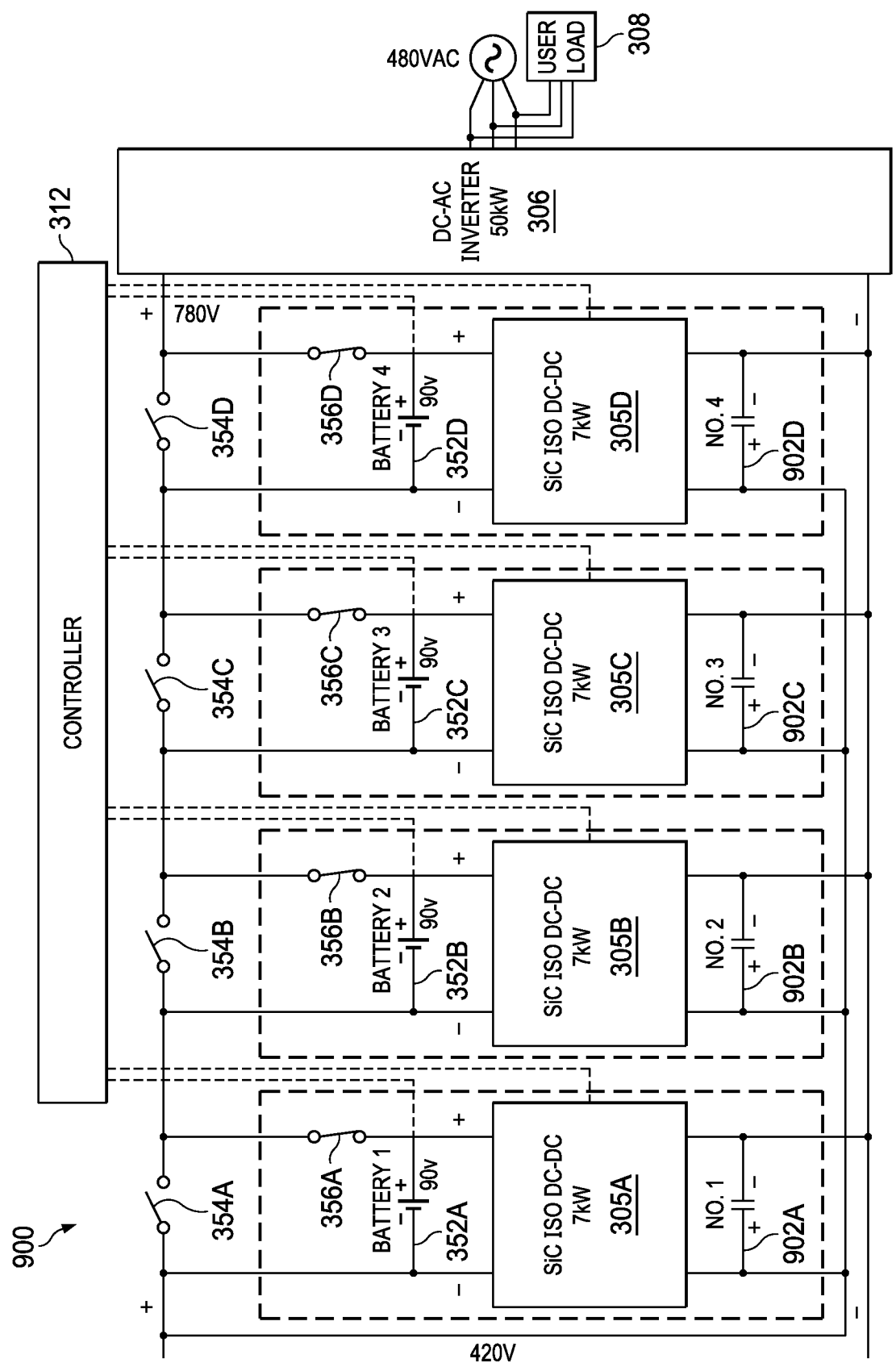
FIG. 9 illustrates the operation of the hybrid PV inverter without power supply from a PV panel in accordance with an embodiment of the present disclosure.

FIG. 9 illustrates an embodiment of a hybrid PV inverter without PV panel power supply 900. This situation may also occur for example, at nighttime, when no photovoltaic is energy available or when the PV panel (not shown) is disconnected for maintenance. Since no PV panel is connected in illustrated embodiment, the grid/load 308 fully relies on power supply from the battery strings 352. Similar to previous figures that also illustrate a hybrid PV inverter topology (FIGS. 2b-3b), this circuit includes a series of isolated DC/DC converters 305, a series of battery strings 352, and a DC/AC inverter 306. Also in this embodiment, each battery string 352 is paired with an isolated DC/DC converter 305, and a system level controller 312 is connected to each of these components. In some embodiments, each isolated DC/DC converter 305 is coupled to a capacitor 902.

In the absence of power supply from a PV panel, the hybrid PV inverter 900 meets power demands through a combination of power supplied by the battery strings 352 and capacitors 902. In this illustrated embodiment, all battery strings 352 are connected to the grid/load 308. In some embodiments, this means that all boost switches 356 are closed and all bypass switches 354 are open to connect all battery strings 352. As a consequence, the battery strings 352 incrementally supply 360V total to the DC/AC inverter 306. In addition to power supplied directly by the battery strings 352, the isolated DC/DC converters 305 maintain total capacitor 902 voltage at around 420V by directing current from each battery string 352 to the capacitors 902. In combination, the battery string 352 and charged capacitors 902 may supply 780V total to the DC/AC inverter 306.

An embodiment of the present disclosure is a power conversion system that includes a main power source configured to deliver drive power to a load; an add-on power module comprising an isolated DC/DC converter and a low voltage source coupled in series with a high voltage source; wherein the add-on power module is coupled to the main power source and the load and configured to output boost power to the load; further wherein the high voltage source is connected to a first port of the isolated DC/DC converter and the low voltage source is connected to a second port of the isolated DC/DC converter; a controller coupled to the power source and the add-on power module, wherein the controller is configured to: determine that the load requires power from the main power source, and if so, direct boost power from the add-on power module to the load; and direct drive power from the main power source to the load when boost power falls below a predetermined threshold. In one or more of the embodiments above, the main power source is a UPS. In one or more of the embodiments above, the boost power is directed from the add-on power module through the closing of a switch that couples the add-on power module to the load. In one or more of the embodiments above, the power the isolated DC/DC converter has a power rating that is determined by the low voltage source; further wherein the power rating is less than the power rating of add-on power module. In one or more of the embodiments above, the controller determines that the load requires power from the main power source by receiving a signal from the main power source. In one or more of the embodiments above, the controller determines that the load requires power from the main power source by sensing the power output of the main power source.

Another embodiment of the present disclosure is a power conversion system that includes a power source configured to output a drive power, one or more power modules, each comprising a DC battery and an isolated DC/DC converter; wherein each power module is coupled to the power source and the load and configured to output boost power and receive drive power; a load; and a controller coupled to the power source and each power module, wherein the controller is configured to direct each power module to: direct drive power to the load; direct drive power to the DC battery; direct boost power to the load; and any combination thereof. In one or more of the embodiments above, the controller is configured to: determine that the load requires power from the power source; direct drive power from the power source to the load; and direct boost power from the one or more power modules to the load when the drive power falls below one or more predetermined thresholds. In one or more of the embodiments above, the power source includes a DC/AC inverter, wherein the DC/AC inverter is configured to provide AC power to the load. In one or more of the embodiments above, the power source is a photovoltaic (PV) panel. In one or more of the embodiments above, the boost power is directed from each power module through the closing of a switch, wherein each switch independently couples each power module to the load. In one or more of the embodiments above, the isolated DC/DC converter of each power module has a power rating less than the power provided to the load. In one or more of the embodiments above, the controller determines that the load requires power from the power source by receiving a signal from the power source. In one or more of the embodiments above, the controller determines that the load requires power from the power source by sensing the drive power of the power source. In one or more of the embodiments above, each power module further comprises a distributed battery management system.

Another embodiment of the present disclosure is a method of power conversion that includes directing drive power from a power source to a load; directing drive power from the power source to one or more power modules, wherein each of the one or more power modules comprises a DC battery and an isolated DC/DC converter; directing boost power from the DC battery of the one or more power modules to the load; and any combination thereof. In one or more of the embodiments above, the method of power conversion further includes determining that a load requires power from a power source; directing drive power from the power source to the load; and directing boost power from one or more power modules to the load when drive power from the power source falls below one or more predetermined thresholds. In one or more of the embodiments above, the method of power conversion further includes controlling the power source and each power module by a controller. In one or more of the embodiments above, the method of power conversion further includes directing boost power from each power module further comprises closing a switch, wherein each switch independently couples each power module to the load. In one or more of the embodiments above, each of the one or more predetermined thresholds determines how many of the one or more power modules directs boost power to the load. In one or more of the embodiments above, determining that the load requires power further comprises receiving a signal from the power source. In one or more of the embodiments above, the method of power conversion further includes determining that the load requires power further comprises sensing the drive power of the power source.

Although the disclosure and its advantages have been described in detail, it should be understood that various changes, substitutions and alterations can be made herein without departing from the spirit and scope of the disclosure as defined by the following claim.

The invention claimed is:

1. A power conversion system comprising:
a power source configured to output a drive power;
a plurality of power modules, each comprising a battery string and an isolated DC/DC converter, wherein each power module is coupled to the power source and a load and configured to output boost power and receive drive power, wherein each of the plurality of power modules comprises a battery management system configured to manage the operation of the battery string, wherein the battery management system comprises one or more cell management units and a battery management unit, wherein the one or more cell management units are paired and connected to the battery management unit, wherein each of the one or more cell management units is coupled to an individual battery of the battery string, wherein the battery management unit is configured to process data received from each of the one or more cell management units and to transmit data to a controller to monitor the battery string; wherein each of the plurality of power modules further comprises a bypass switch and a boost switch;
a DC/AC inverter, wherein the DC/AC inverter is configured to provide AC power to the load, wherein each of the plurality of power modules is disposed between the power source and the DC/AC inverter and connected directly to each other in series;
the load; and
the controller coupled to the power source and each power module, configured to:
direct drive power to the load by bypassing each of the plurality of power modules through the closing of each associated bypass switch and the opening of each associated boost switch to directly connect the power source to the load;
direct drive power to the battery string; and
direct boost power to the load.

2. The power conversion system of claim 1, wherein the controller is configured to:
determine that the load requires power from the power source;
direct drive power from the power source to the load; and
direct boost power from the plurality of one or more power modules to the load when the drive power falls below one or more predetermined thresholds.

3. The power conversion system of claim 2 wherein the controller determines that the load requires power from the power source by receiving a signal from the power source.

4. The power conversion system of claim 2 wherein the controller determines that the load requires power from the power source by sensing the drive power of the power source.

5. The power conversion system of claim 1, wherein the power source is a photovoltaic (PV) panel.

6. The power conversion system of claim 1 wherein boost power is directed from each power module through the closing of the boost switch and the opening of the bypass switch.

7. The power conversion system of claim 1 wherein the isolated DC/DC converter of each power module has a power rating less than the power provided to the load.

8. A method of power conversion comprising:
directing drive power from a power source to a load by bypassing each of a plurality of power modules through the closing of each associated bypass switch and the opening of each associated boost switch;
directing drive power from the power source to the plurality of power modules, wherein each of the plurality of power modules comprises a battery string and an isolated DC/DC converter comprising a dual-active bridge topology, wherein each of the plurality of power modules comprises a battery management system configured to manage the operation of the battery string, wherein the battery management system comprises one or more cell management units and a battery management unit, wherein the one or more cell management units are paired and connected to the battery management unit, wherein each of the one or more cell management units is coupled to an individual battery of the battery string, wherein the battery management unit is configured to process data received from each of the one or more cell management units and to transmit data to a controller to monitor the battery string, wherein each of the plurality of power modules further comprises a bypass switch and a boost switch; and directing boost power from the battery string of the plurality of power modules to the load by closing each associated boost switch and opening each associated bypass switch of plurality of power modules, wherein a DC/AC inverter is configured to provide AC power to the load from the power source, the plurality of power modules, or both, wherein each of the plurality of power modules is disposed between the power source and the DC/AC inverter and connected directly to each other in series.

9. The method of claim 8 further comprising:

determining that a load requires power from a power source;

directing drive power from the power source to the load; and directing boost power from the plurality of power modules to the load when drive power from the power source falls below one or more predetermined thresholds.

10. The method of claim 9 wherein each of the one or more predetermined thresholds determines how many of the plurality of power modules directs boost power to the load.

11. The method of claim 9 wherein determining that the load requires power further comprises receiving a signal from the power source.

12. The method of claim 9 wherein determining that the load requires power further comprises sensing the drive power of the power source.

13. The method of claim 8 further comprising controlling the power source and each power module by a controller.

14. The method of claim 8 further comprising bypassing each of the plurality of power modules through the closing of each associated bypass switch and the opening of each associated boost switch.

* * * * *